S. MONTGOMERY.
FLYING MACHINE.
APPLICATION FILED DEC. 14, 1908.
962,652.
Patented June 28, 1910.
8 SHEETS—SHEET 8.
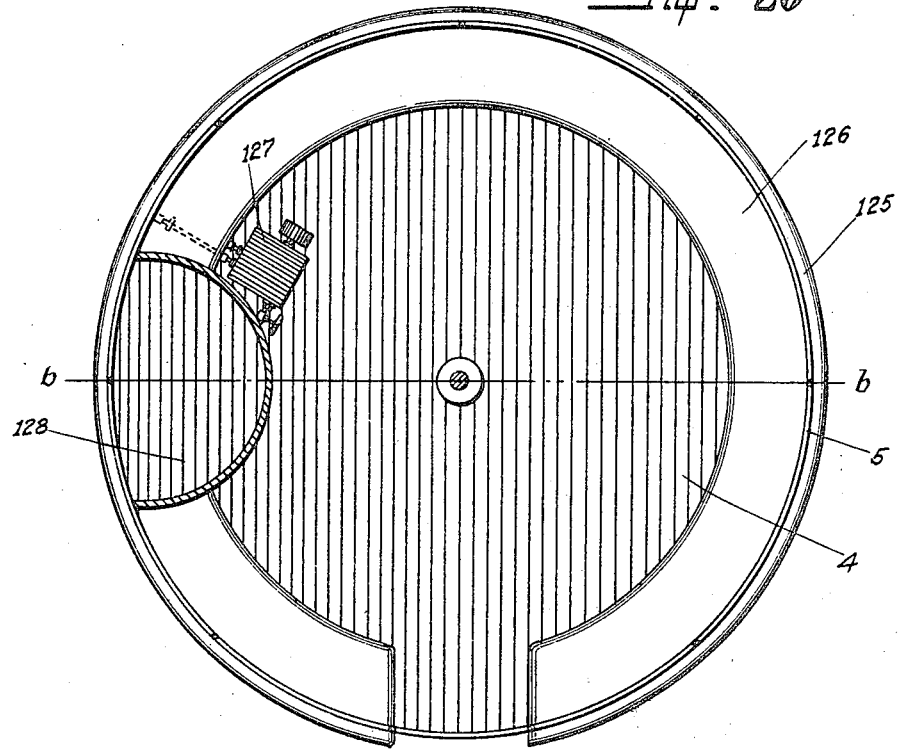
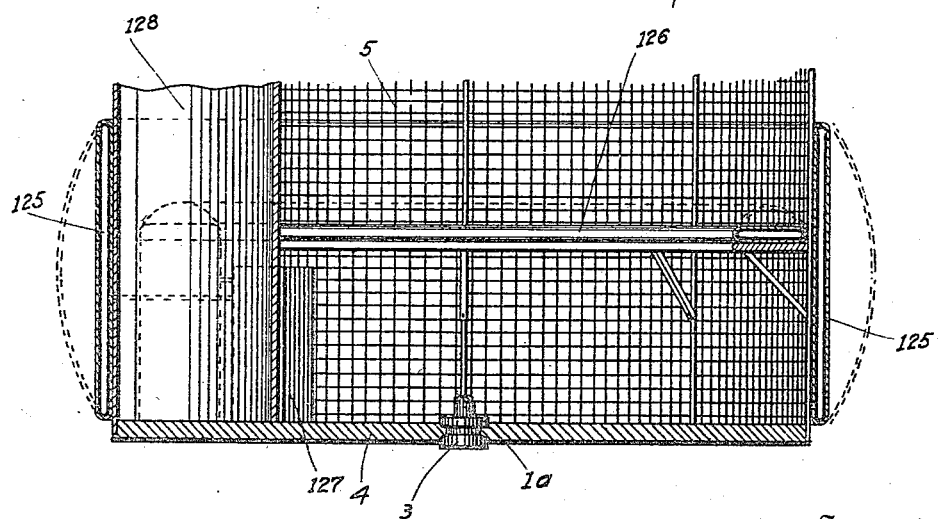
Witnesses
Inventor
Samuel Montgomery
Attorney

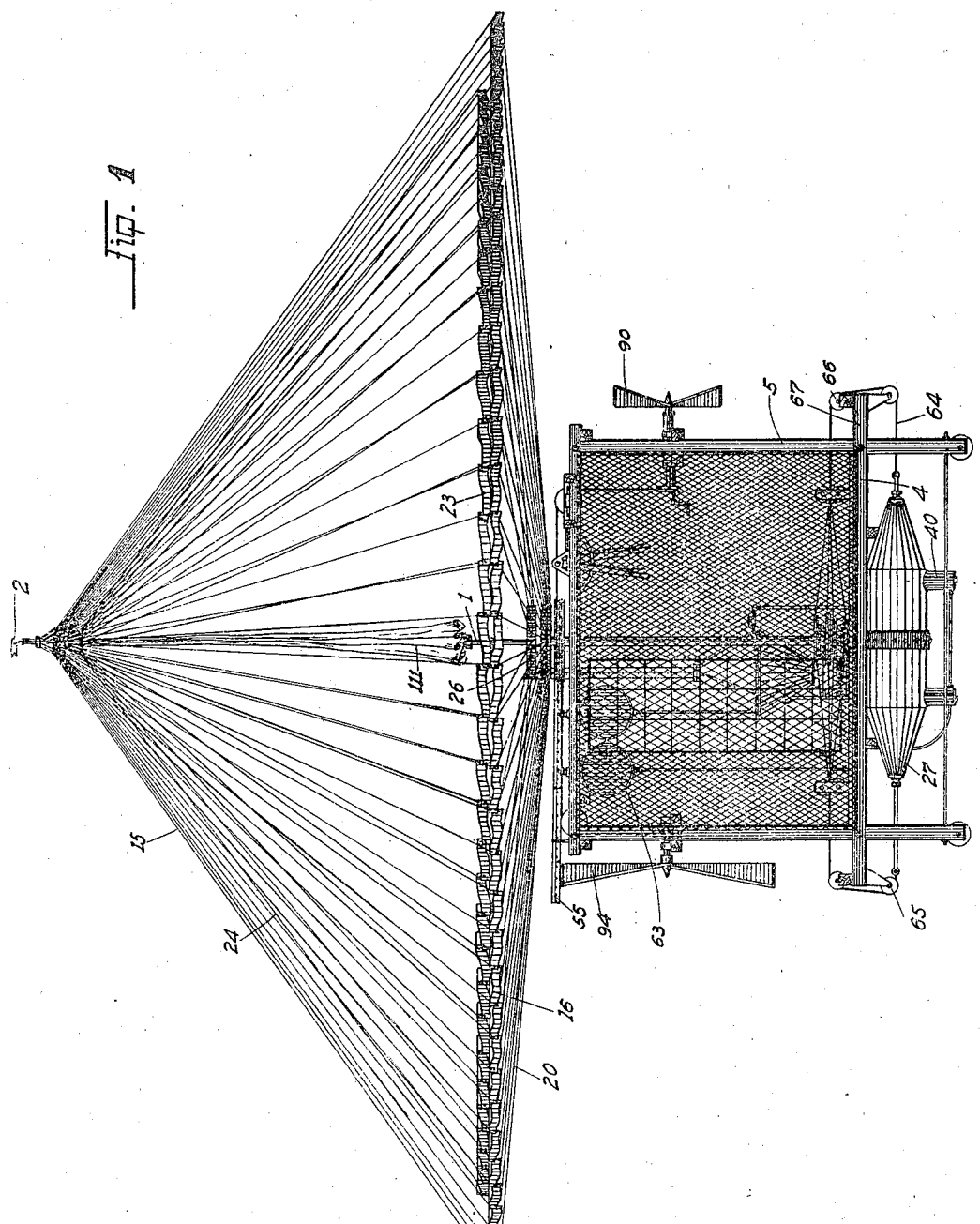

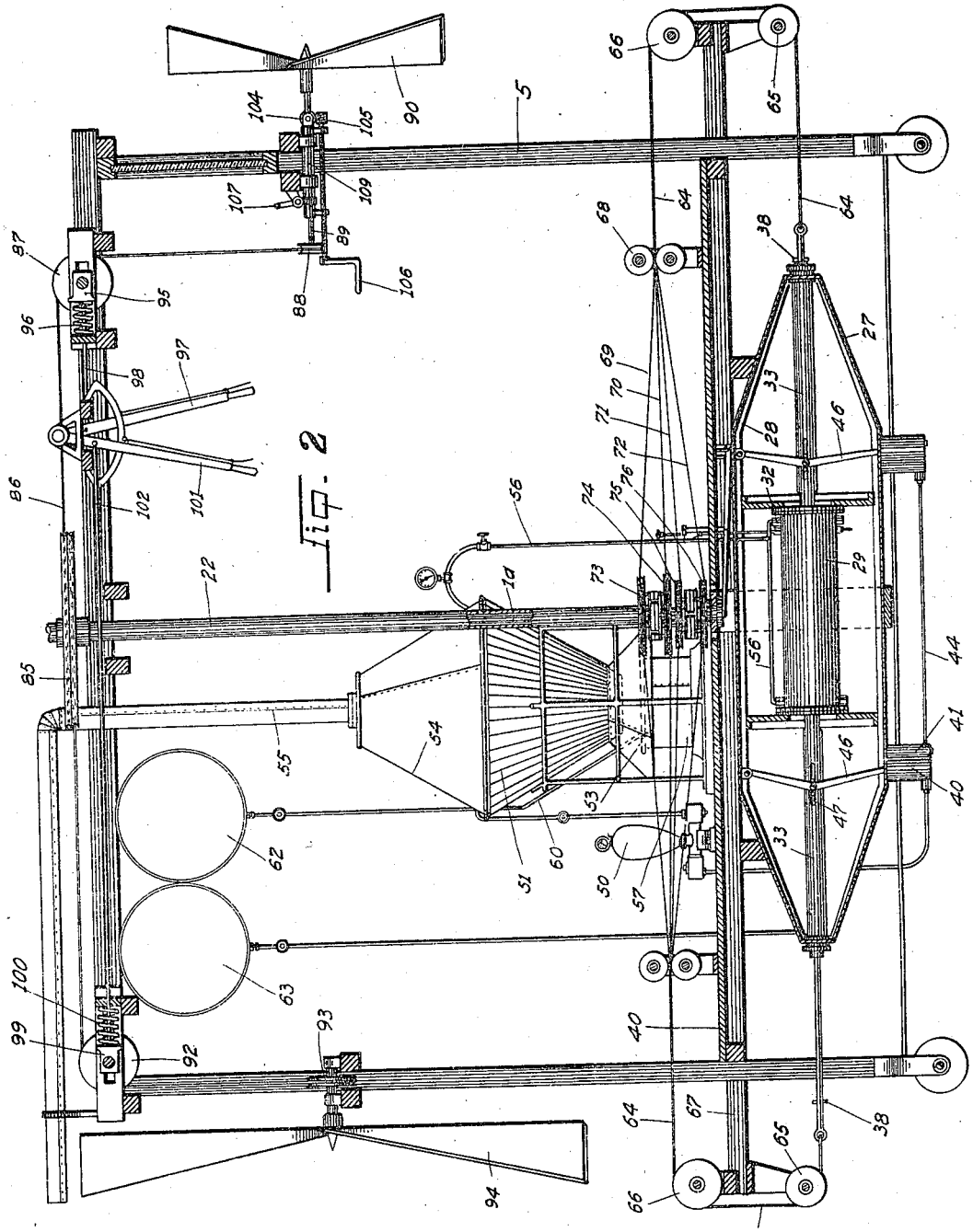

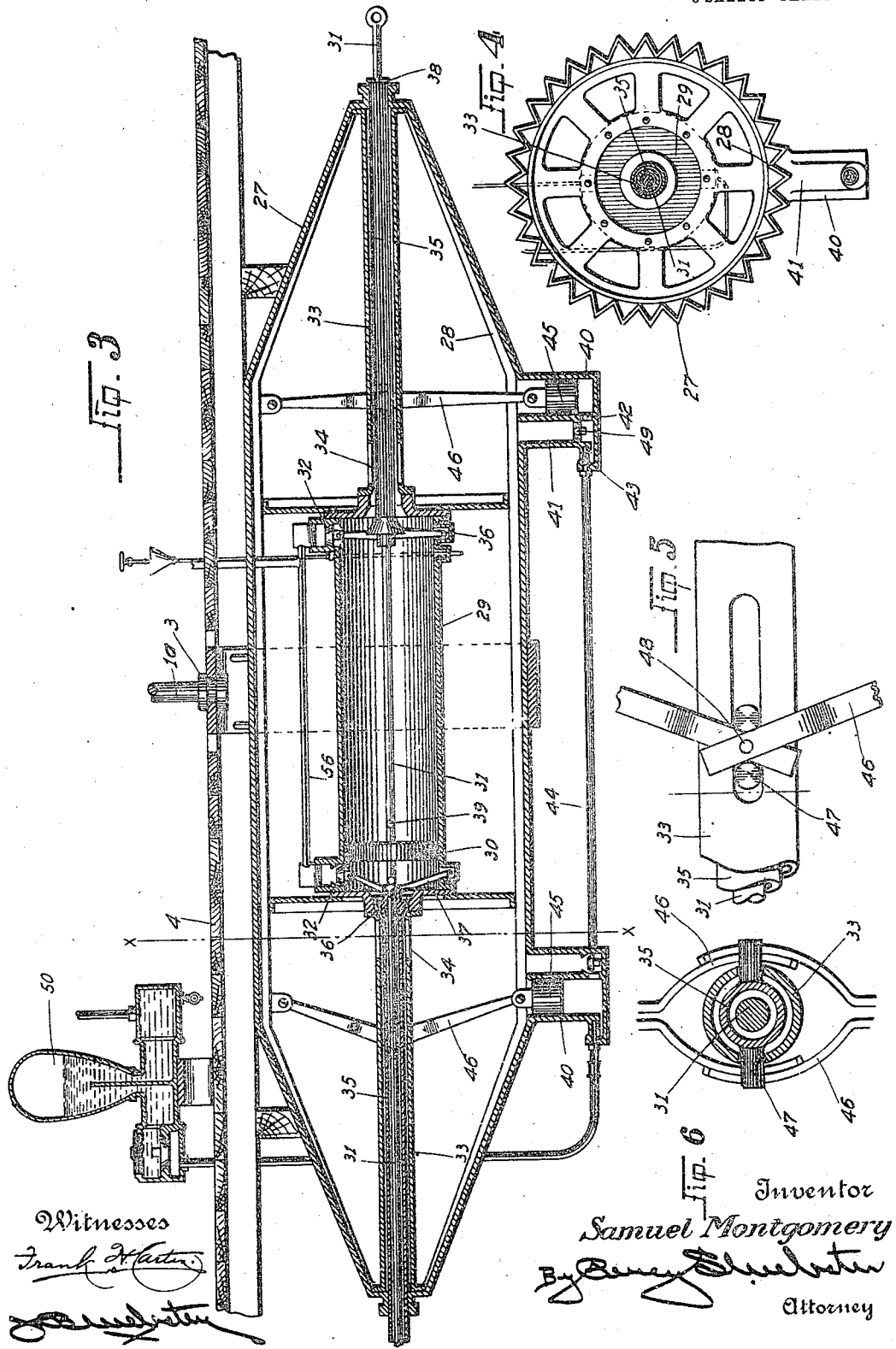

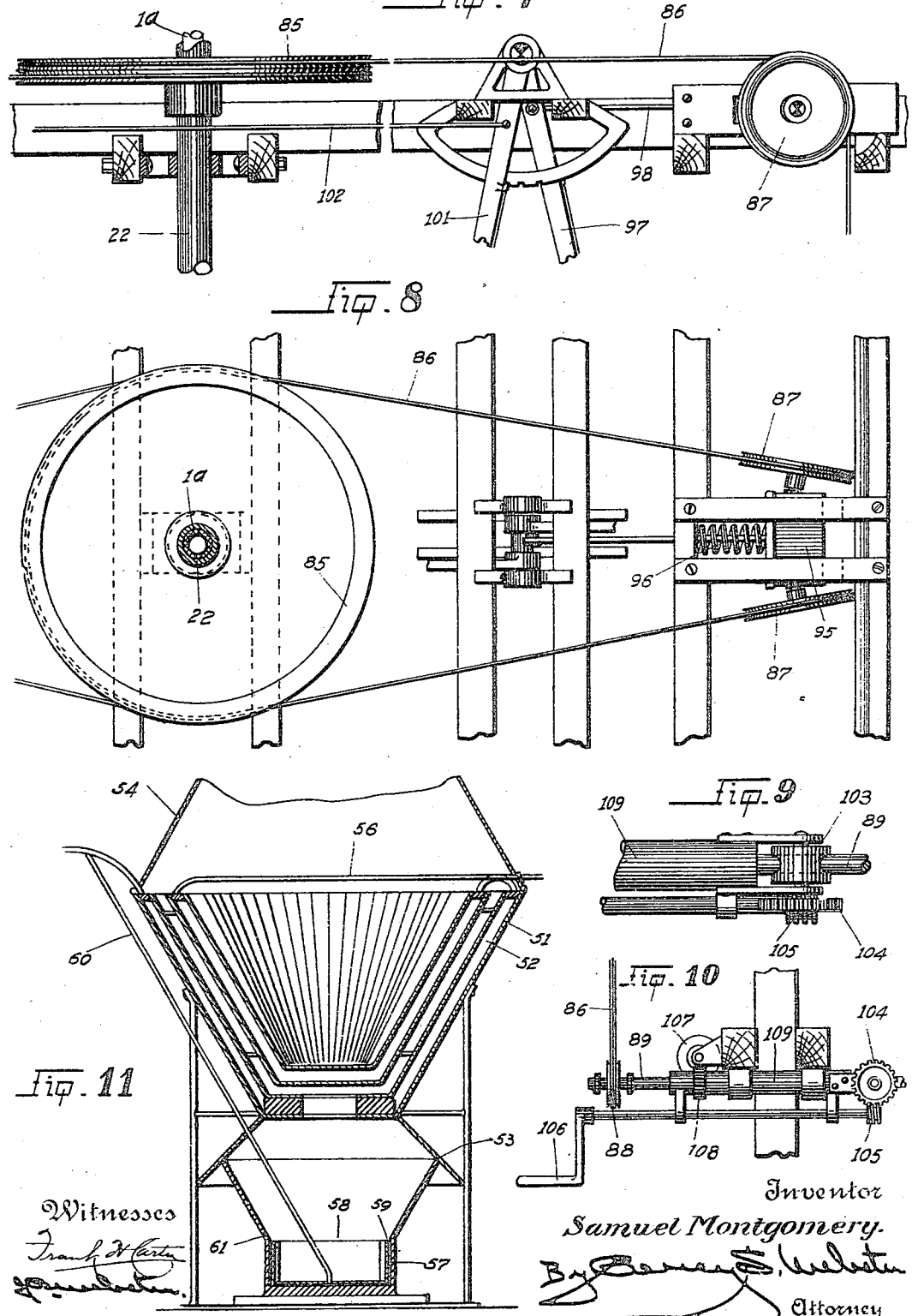

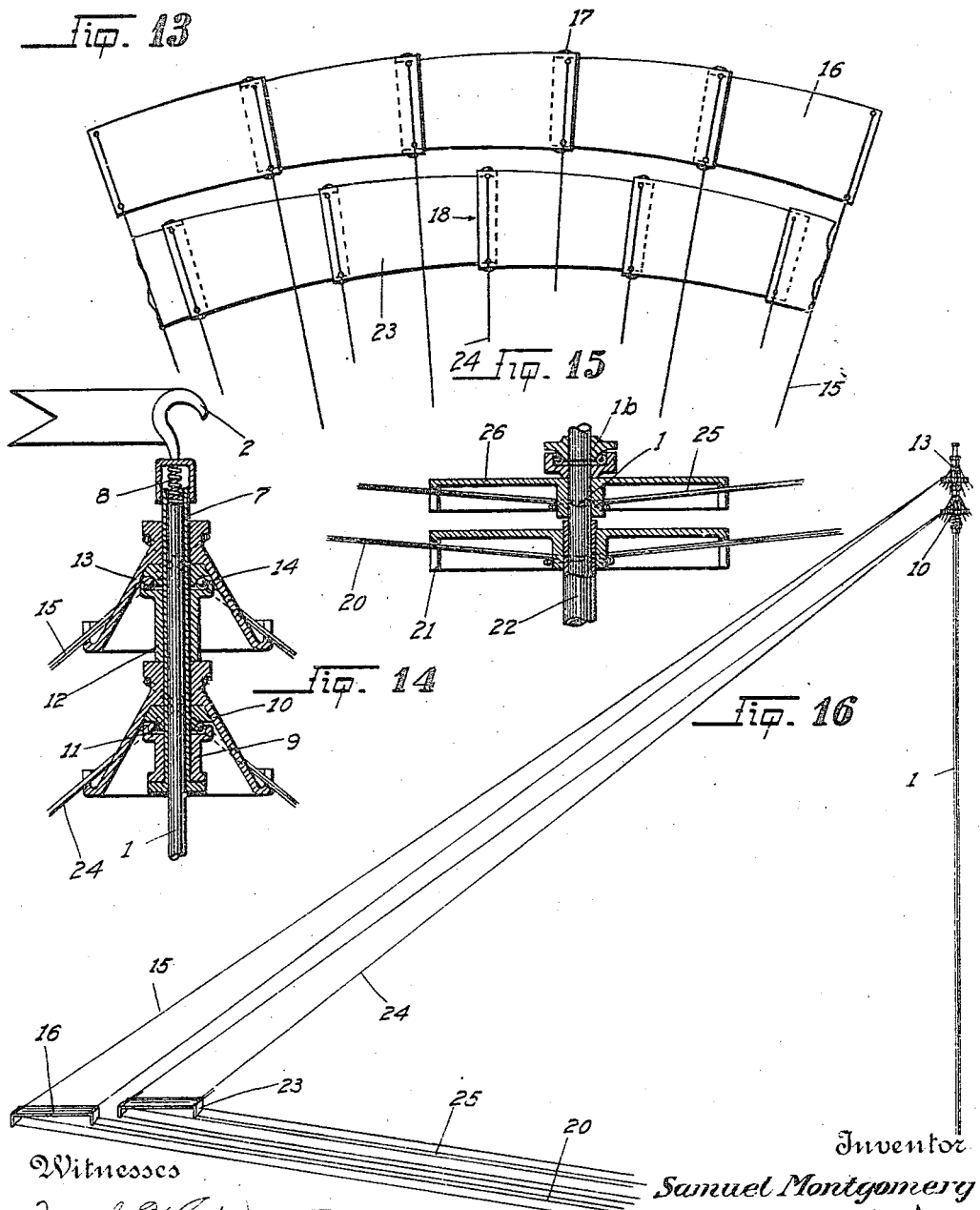

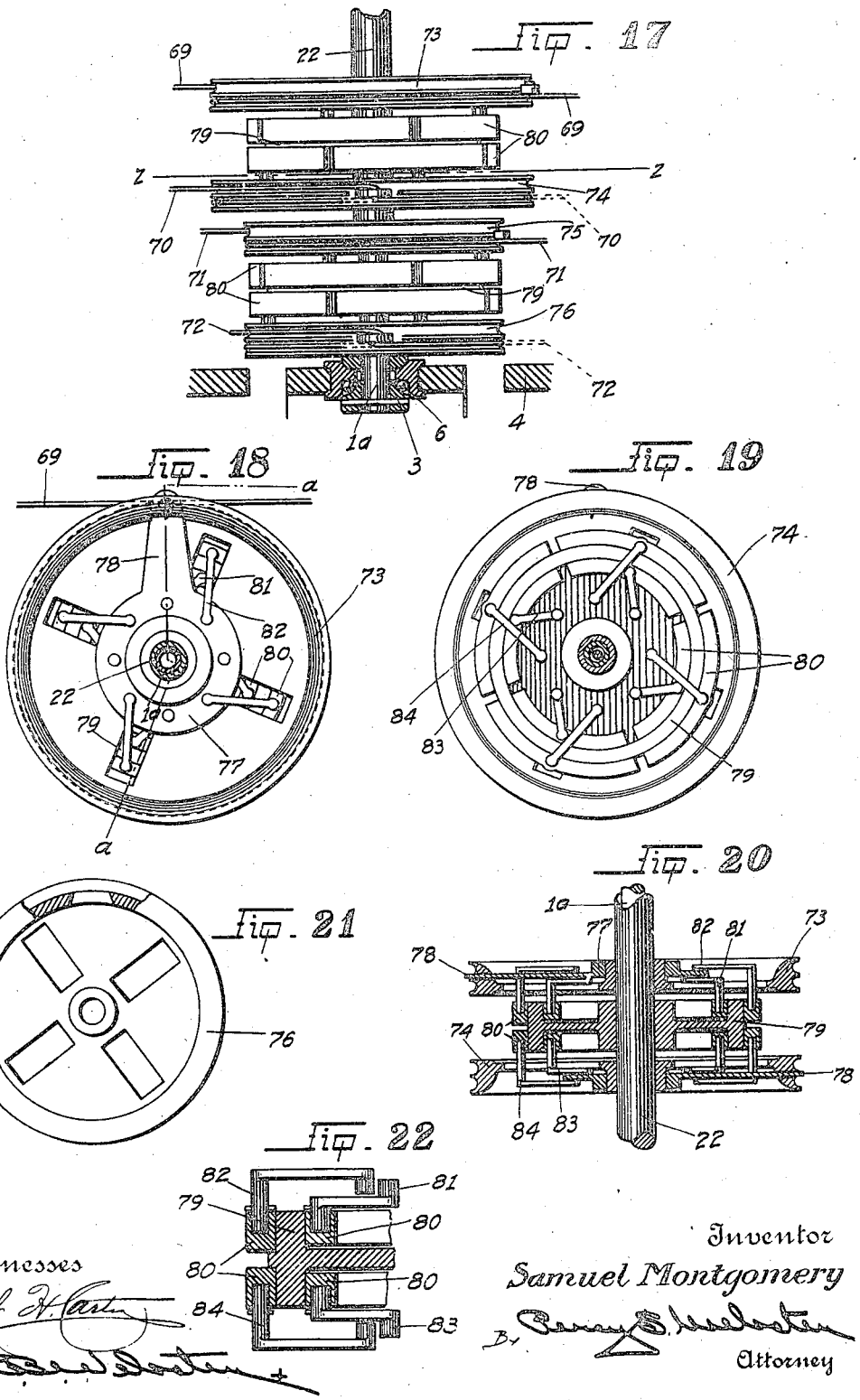

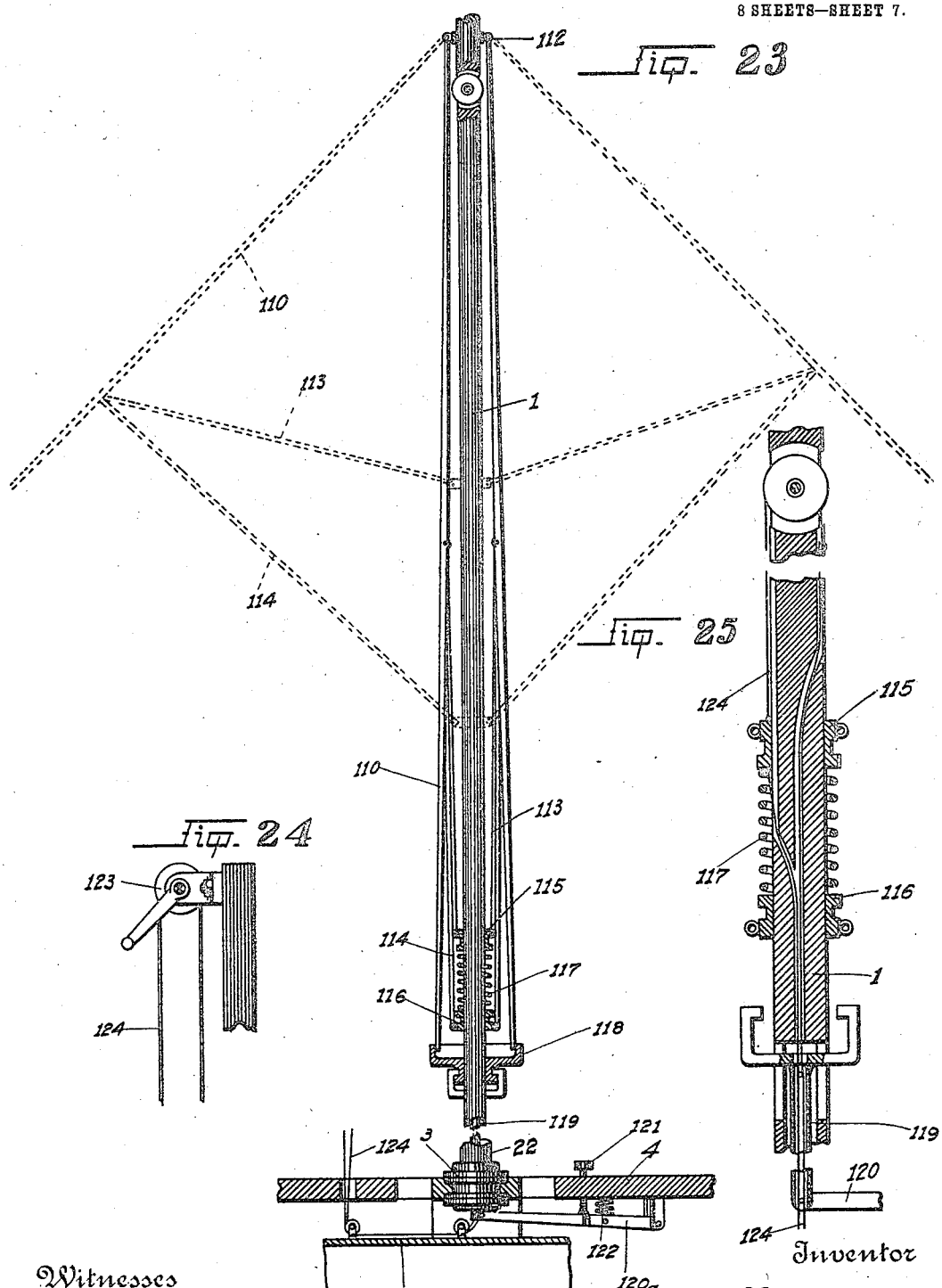

UNITED STATES PATENT OFFICE.

SAMUEL MONTGOMERY, OF STOCKTON, CALIFORNIA.

FLYING-MACHINE.

962,652.

Specification of Letters Patent.  Patented June 28, 1910.

Application filed December 14, 1908. Serial No. 467,469.

*To all whom it may concern:*

Be it known that I, SAMUEL MONTGOMERY, a citizen of the United States, residing at Stockton, in the county of San Joaquin, State of California, have invented certain new and useful Improvements in Flying-Machines; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in flying or aerial machines and particularly to that class commonly known as aeroplanes, the object of the invention being to produce a machine which will rise as soon as the mechanism is started in motion and one which can be readily directed in a vertical motion or longitudinal motion as may be desired and one in which the speed may be regulated accurately either to a high speed or low speed as required.

A further object of the invention is to produce a means of safety in case anything occurs to disable the motive mechanism.

I also aim to provide an engine for the machine which will use alcohol or other fluid for steam, such engine having condensing means whereby the same material may be used and reused for the purpose.

A further object of the invention is to provide an engine which will not have a dead center but one which will be always ready to start instantly when the steam is admitted thereto.

A further object of the invention is to produce a simple and inexpensive device and one which can be readily constructed for the use of every class of people and one which can be used for transporting freight as well as persons with ease and accuracy.

These main objects and many minor ones I accomplish by means of a main center pair of shafts or supports one rotatable upon the other, suspended on the lower end of which is a cage or cab suitably inclosed by wire mesh or other desired material within which cab or cage is disposed the running gear, there being a condensing drum suspended from the bottom of such cab or cage within which drum is an engine adapted to be operated by alcoholic, or other fluid, vapor steam generated within a boiler in said cab or cage and adapted to be condensed after use by such condenser and returned to said boiler. The engine described above drives cables which rotate clutch drums on a sleeve rotatably mounted on said lower shaft which drums rotate umbrella shaped brace members maintaining motive vanes so constructed as to raise themselves upon the air thus carrying the cage and other parts upward also.

To make a safety mechanism provided anything occurs to the main mechanism I provide a parachute on the main standard which can be opened instantly and closed easily when not in use. The condenser is also adapted to displace sufficient water to maintain the machine when it lights in water and I also provide air bags or cushions for the same purpose.

In practice of course such other and further structure and relative arrangement of parts are employed as are necessary for the perfect manipulation of the machine, all as will more fully appear by a perusal of the following specification and claims.

In the drawings similar characters of reference indicate corresponding parts in the several views.

Figure 1 is a side elevation of the complete machine. Fig. 2 is an enlarged sectional view of the cage and engine of the machine. Fig. 3 is an enlarged vertical sectional view of the engine and condenser. Fig. 4 is a sectional view taken relatively on a line $x$—$x$ of Fig. 3. Fig. 5 is a fragmentary view of a piston operating mechanism. Fig. 6 is an enlarged sectional view taken relatively on a line $y$—$y$ of Fig. 5. Fig. 7 is a fragmentary side elevation of a running gear and control therefor. Fig. 8 is a top plan view of the same. Fig. 9 is a top plan view of a steering gear. Fig. 10 is a side elevation of the same. Fig. 11 is a sectional view of the boiler and burner of the engine. Fig. 12 is a fragmentary view of the actuating vanes of the machine. Fig. 13 is a top plan view of the same. Fig. 14 is a fragmentary sectional view of the top supporting rod and sleeves for the actuating vanes. Fig. 15 is a sectional view of the bottom supporting drums of the vanes. Fig. 16 is a fragmentary side view of the actuating vane structure. Fig. 17 is a side elevation of the propelling drums and grooved sheaves and clutch mechanism. Fig. 18 is a top plan view of a friction clutch. Fig. 19 is a sectional view taken on a line z—z of Fig. 17 with friction actuating pins shown in full as will appear. Fig. 20 is a sectional view taken on a line a—a of Fig. 18. Fig. 21 is a top plan view of a pulley partly broken out. Fig. 22 is a fragmentary view of a friction pin actuating mechanism. Fig. 23 is a sectional view of a safety parachute mechanism. Fig. 24 is a sectional view of a parachute raising mechanism. Fig. 25 is a fragmentary view of a parachute lowering mechanism. Fig. 26 is a top plan view of an air bag supporting means. Fig. 27 is a sectional view taken on a line b—b of Fig. 26.

Referring now more particularly to the characters of reference on the drawings 1 designates the main supporting shaft or standard of the machine, rotatable below which is a shaft 1ª, connected with the same by means of ball bearings 1ᵇ. Suspended on the lower end of the shaft 1ª by means of collars 3 is the floor 4 of a cage or cab 5, such collars 3 having interposed between them ball bearings 6. Disposed over the top of the shaft 1 is an inverted recessed cap 7, there being a spring 8 bearing between the bottom of the recessed cap 7 and the top of the shaft 1. Rotatably mounted on the cap 7 is a sleeve 9 mounted on which is a frusto-conical cap 10 turnable on ball bearings 11 and mounted on the cap 7 and bearing on the top of the cap 10 is a sleeve 12 bearing on which is another frusto-conical cap 13 rotatable on ball bearings 14. Secured on the caps 13 are wires 15 extending obliquely downward and connected with inverted channel shaped vanes 16, such vanes being disposed circumferentially and joined together as at 17 in such manner as to admit an air space or inlet 18 between each adjacent pair of vanes, the vanes being suitably curved as at 19 to permit the above construction. From the vanes 16 wires 20 extend to a drum 21 secured to a sleeve 22 rotatable on the shaft 1ª, as will hereinafter appear, the rotation of the vanes causing the air to pass into the channels through the spaces 18 thus lifting the same into the air, such operation being assisted by means of another circle of vanes 23 within the vanes 16 suspended by wires 24 wrapped around the cap 10 and such vanes 23 also having brace wires 25 secured to a drum 25 rotatable on the shaft 1ª, such inner vanes 23 being constructed exactly as are the outer vanes 16 and being adapted to rotate in the opposite direction therefrom, such opposed operation of the vanes being designed to cause the machine to rise in a direct vertical manner and uprightly into the air and to maintain its equilibrium therein, the forward or backward movement of the same being accomplished by other propelling means as will appear.

To drive the rising motive vanes described above and also to drive the machine longitudinally as will hereinafter appear, I provide an engine and apparatus for running the same which is constructed as follows:—Suspended on the under side of the floor 4 is a condensing drum 27 having a plurality of corrugations 28 in its side to present a greater cooling surface, the ends of such drum 27 being frusto-conical in shape to cut the air more easily and also to permit the air to distribute more fully over the entire corrugated surface of the condenser. Within the condenser is a cylinder 29 in which is a piston 30 having a piston rod 31, there being an intake valve 32 at each end of the cylinder 29. Extending from the ends of the cylinder 29 to the ends of the condenser 27 and opening into said cylinder 29 are hollow tubes 33 having ports 34 opening into the condenser 27. Within the tubes 33 and encircling the rod 31 are sleeves 35 adapted to project normally slightly beyond the ends of the condenser 27 and having inner valves 36 adapted to form a closure over the opening from the cylinder 29 into the tube 33 at that end when the sleeve projects beyond the end of the condenser and when this is true the piston 30 is also at the same end of the cylinder 29 and the valve 32 at that end is held open by links 37 flexibly connected with the sleeves 35 thus permitting the entrance of steam through the valve 32 into the cylinder, which steam drives the piston 30 to the other end of the cylinder 28 and then a pin 38 engages the projecting end of the sleeve 35 and drives it inward and opens a valve 36 and causes the links 37 to close the valve 32 and thus permit the steam to escape to the condenser 27 through the ports 34. As the piston approaches the end of the cylinder a pin 39 engages the sleeve 35 and drives it outward, closing the valve 36 and opening the valve 32 as described and this motion and operation is repeated with each drive of the piston, thus giving me a double action on the piston.

In the bottom of the condenser 27 I have provided two force ejectors constructed as follows:—Two cylinders 40 and 41 are disposed side by side at each end of the condenser 27 the two being connected by a lower port 42 and having a common outlet force valve 43 connecting with a pipe 44 leading to the boiler of the engine, (hereinafter described). In the cylinders 40 are pistons 45 having a drive rod 46 flexibly joined with the sleeve 35 by means of projecting pins 47 engaging said rod 46 at a flexible joint 48 whereby with each move of the sleeves 35 the piston 45 will first open a valve 49 in the cylinder 41 and draw a quantity of the condensed liquid from the cylinder 41 into the cylinder 40 and then with its downward drive it will close the valve 49 and force the valve 43 open and drive the liquid into the pipe 44 and thence into an equalizing constant force pump 50 from whence it is forced into the boiler of the engine, which boiler is constructed of a plurality of flaring cups 51 spaced apart one within the other forming intermediate spaces 52, the center one of which opens into a burner or fire box 53 and to a flue 54 having a draft stack 55, the other spaces 53 being suitably connected and having a pipe 56 connecting them with the valves 32. Within the box 53 is a bottom cup 57 into which is forced an auxiliary cup 58 having vertical corrugations 59 in its sides, there being an alcohol or other liquid fuel supply pipe 60 entering the bottom of the cup 58, and the gasified alcohol, or other liquid fuel burning from the top of the corrugations, and receiving its draft through a plurality of holes 61 in the side of the box 53 just above the top of the cup 58. A supply drum 62 supplies the pipe 60 while a drum 63 may be connected with the condenser 27 for supplying fluid should the condensing be not sufficient to keep the boiler supplied.

On each end of the driving piston rod 31 is an endless rope or cable 64 which runs over sheaves 65 and 66 on the ends of frames 67 on the floor 4 and thence between sheaves 68 within the cage 5, such cables radiating into four strands 69, 70, 71 and 72, the strand 69 winding around a pulley 73 freely turnable on the sleeve 22, the strand 70 around a pulley 74 freely turnable on the shaft 1$^a$ and the strand 72 around a pulley 76 freely turnable on the shaft 1$^a$. Journaled on the hub of each of the pulleys 73 to 76 is a disk 77 having an arm 78 projecting through the rim of the pulley through which arm the strand around said pulley passes. Disposed between the pulleys 73 and 74 is a friction pulley 79 keyed to the sleeve 22, on either side of which pulley are a double set of segmental friction members 80, the inner upper ones being connected with such disk by pins 82. Similarly the lower inner and outer members 80 are connected with the disk 77 on the pulley 74 by means of pins 83 and 84 respectively (best seen in Figs. 17, 18, 19, 20, 21 and 22). Similarly there is disposed between the pulleys 75 and 76 a friction clutch constructed as above described.

When the engine operates, the cable 64 draws first one way and then another and to counteract this intermittent motion and give the rising vanes a continuous motion is the object of the friction clutch mechanism described above.

The operation is as follows:—When the pulley 73 rotates in one direction it causes the pins 81 and 82 to cause the members 80 to grip the pulley 78 and drive the sleeve 22 and incidentally the vanes 16 and the pulley 74 rotating the same way and the pins 83 and 84 being reverse to the pins 81 and 82 the pulley 73 runs free but on the reverse movement the pulley 73 causes the pins 83 and 84 to cause the members 80 to grip the pulley 79 and continue its rotary movement. Similarly the pulleys 75 and 76 operate to rotate the shaft 1$^a$ and vanes 23, the construction being such as to rotate such vanes 23 in a direction opposite to that of the vane 16 for the purposes hereinbefore set forth.

Keyed onto the sleeve 22 just above the cage 5 is a pulley 85 around which a cable 86 is wound, such cable operating at the front end of the machine over sheaves 87 and then around a pulley 88 on a shaft 89 on the outer end of which shaft is a propeller 90 and similarly the other end of the cable 86 extends over sheaves 91 and then around a pulley 92 on a shaft 93 carrying a propeller 94. The sheaves 87 are journaled in slidable blocks 95 maintained in normal position by means of springs 96. To stop the operation of the propeller 90 a lever 97 is operated to cause a cable 98 to slide the block to loosen the cable 86 so as to run loosely around the pulley 88 without rotating the same. Similarly the sheaves 92 are journaled in blocks 99 maintained by springs 100, there being a lever 101 and cable 102 for sliding the block 99 to loosen the cable 86 to stop the rotation of the pulley 93 and propeller 94.

The propeller 90 in addition to its function as a propeller is designed to perform the functions of a rudder for deflecting the machine upward, downward or side wise, the construction and operation being as follows:—the shaft 89 is formed with a flexible joint within a drum 103, such drum being turnable upward or downward by means of a gear 104 intermeshing with a worm gear 105 provided with a handle crank 106 to turn said gears to tilt the propeller 90 upward or downward and to turn it to either side a handle 107 is operated to turn a gear 108 on a sleeve 109 within which the shaft 89 is disposed and on which the drum 103 and gears 104 and 105 are disposed, the turning of which brings these parts at right angles to their normal position and then the handle 106 is operated to turn the propeller 90, which, by reason of the changed position of the parts can be turned to either side as required for steering purposes.

As a safety means and also as a means for protection from sun or rain I have provided a parachute on the shaft 1 within the operating vanes, which parachute is constructed and operates as follows:—On the shaft 1 within the supporting wires of the motive vanes is disposed the parachute composed of ribs 110 over which may be stretched any suitable fabric or material 111, such ribs being pivoted to a collar 112 on the said shaft 1. Pivotally connected with the ribs 110 are brace members 113 and 114 pivotally connected with collars 115 and 116 respectively, such collars being slidably disposed on the shaft 1, and having a coil spring 117 bearing therebetween which spring is normally compressed. When the parachute is closed, the ends of the ribs 110 fit into a collar 118, which collar is slidable on the shaft 1 and having an arm 119 extending through the floor 4 and connected with a lever 120 having a foot tread 121 and a spring 122 to maintain the normal position of the collar 118. To open the parachute the operator presses the tread 121 which operates the lever 120 and arm 119 to disengage the collar 118 from the ribs 110 and then the pressure of the spring 117 and the natural suspension of the air drives the braces 113 and 114 apart and opens the ribs 110. To close the parachute a reel 123 is operated to actuate an endless rope 124 connected with the collar 115 to pull such collar downward and incidentally the ribs 110 until they again engage the collar 118.

As before described the condenser 27 also serves the function as a water displacer when the machine alights in water and to further this function I provide an outer water proof bag surrounding the outer edge of the cage 5 (shown in circular form in Fig. 26). This bag is connected with an air pump 127 to inflate it when alighting in water. Also an inner cushion 126 may be both utilized as a seat and for buoyancy as above it also being connected with the pump 127.

For use in high altitudes, I provide an air tight compartment to be filled with oxygen for use should the air become so rarefied as to distress any of the occupants of the machine.

From the foregoing description it will be readily seen that I have produced a flying machine which substantially fulfils the objects of the invention as set forth herein. The vanes constructed as described give the necessary rise into the air. The engine having no dead center is also capable of maintaining a proper motion to such vanes. By the use of alcohol as a fuel and for steam and condensing and reusing the steam, I am capable of making long flights with but a small amount of weight on the machine.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A flying machine comprising a main shaft carrying a cage, a motive means on said shaft, and a parachute on said shaft, means for maintaining said parachute in a normal closed position, and a spring actuated means for throwing said parachute open.

2. A flying machine comprising a main shaft, air vanes disposed on said shaft, such air vanes comprising a plurality of inverted channel irons circumferentially disposed and joined at their ends, means for rotating such vanes, and a cage on said shaft, as described.

3. A flying machine comprising a main shaft, air vanes thereon, such vanes comprising a plurality of inverted channel members circumferentially disposed and joined at their ends, and spaced apart at such ends to form intermediate air spaces, means for rotating such vanes, and a cage on said shaft, as described.

4. A flying machine comprising a shaft, a cage suspended thereon leaving the shaft free to turn, motive air vanes on said shaft, such vanes being operated by an engine, such engine being secured to said cage and comprising a cylinder, a double action piston therein, a piston rod on said piston, cables on said rod, pulleys on said shaft, such cables extending around such pulleys, and friction clutches engageable with said pulleys for rotating such shaft, as described.

5. A flying machine comprising a shaft, motive vanes thereon, two pulleys spaced apart, and loosely turnable on said shaft, a friction clutch member keyed to said shaft between said pulleys, means for turning said pulleys alternately in opposite directions, and means for engaging said clutch alternately with said pulleys, and a cage adapted to be carried by said shaft.

6. A flying machine comprising a main shaft, motive means thereon, a cage on said shaft, and an inflatable bag around said cage.

7. A flying machine comprising a cage, a means for lifting said cage into the air and engine for driving such lifting means, such engine comprising a condensing drum, a cylinder within said drum, a piston in said cylinder, a rod on said piston, valves in said cylinder, means on said rod for opening and closing said valves, and means permitting the escape of steam from said valves, as set forth.

8. A flying machine comprising a shaft, a cage suspended thereon, shafts journaled in said cage, propellers on said shafts, pulleys on said shafts, a pulley on said first named shaft, an endless cable engaging all of said pulleys, means for disengaging said cable from said first named pulleys and means for rotating said pulley on said first named shaft.

In testimony whereof I affix my signature in presence of two witnesses.

SAMUEL MONTGOMERY.

Witnesses:
 PERCY S. WEBSTER,
 JOSHUA B. WEBSTER.